Oct. 4, 1938.     T. B. WAGNER     2,132,251
MANUFACTURE OF STARCH FROM INDIAN CORN
Filed June 18, 1935
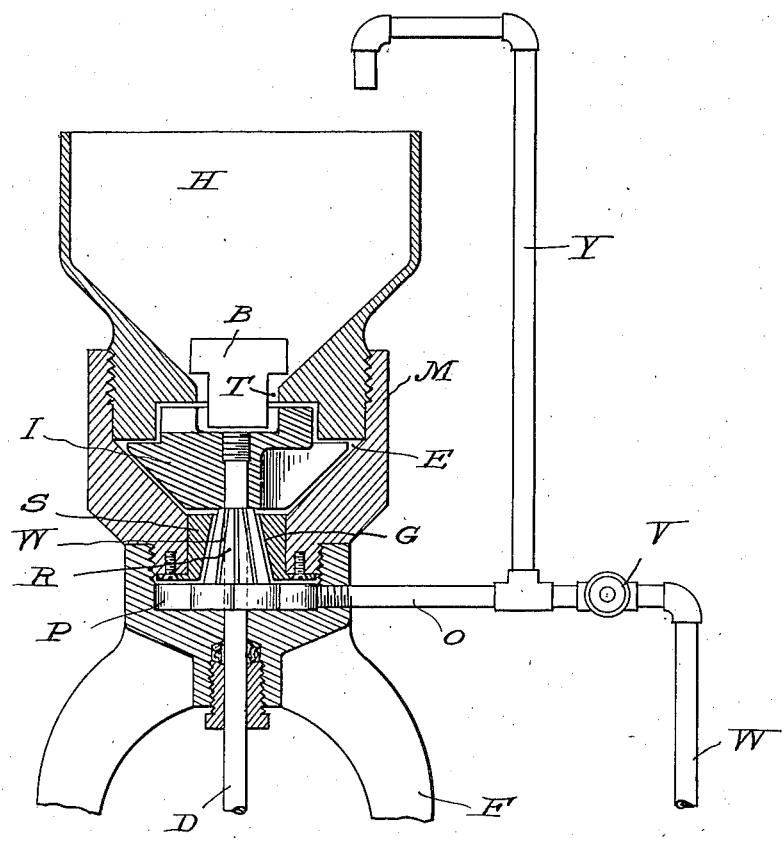
INVENTOR.
THEODORE B. WAGNER
BY
ATTORNEY.

UNITED STATES PATENT OFFICE 2,132,251

MANUFACTURE OF STARCH FROM INDIAN CORN

Theodore B. Wagner, Brooklyn, N. Y.

Application June 18, 1935, Serial No. 27,186

7 Claims. (Cl. 127—69)

This invention relates to improvements in the manufacture of starch from Indian corn and, more particularly, to a process of separating the gluten from the starch of the corn.

The milling process heretofore employed in the manufacture of starch is well known to those skilled in the art and has been fully described in text books and in the patent literature. A brief recapitulation may therefore suffice:

Shelled corn is steeped in water, which contains a small quantity of dissolved sulfur dioxide gas, and is then passed through degerminating mills and germ separators. The degerminated corn is subsequently ground in burr mills, which yield, suspended in water, a finely ground mixture of starch, gluten and fibrous matter. The latter is separated by passing the mixture successively through perforated copper and silk reels. The separation of the starch from the gluten, the so-called "primary" separation, was heretofore accomplished by slowly passing the mixture of starch and gluten, suspended in a large body of water, over long and narrow troughs, or "tables", which were set up so as to have a pitch of about three inches to 100 feet of table length. This mixture, known in the art as "table heads" and consisting, in the main, of about 90–92% of starch and about 7–8% of gluten (calculated on dry substance basis), was delivered onto the tables, at a gravity of about 6° Beaumé; the starch settled on the bottom throughout the length of the tables, whereas the bulk of the gluten tailed over adjustable weirs at the lower ends of the tables. After a layer had been built up on the tables, about 9 inches high, the feed was stopped, the starch removed by flushing with water and the gluten delivered to filter presses and other suitable water-removing and finishing apparatus.

The shortcomings of the old method of separating the gluten from the starch were manifold, the following being among its outstanding disadvantages, to wit:

1. Intermittent operation of the starch tables.
2. Loss of time, caused by such intermittent operation.
3. Special labor required for
   (a) controlling the flow of table heads unto the tables;
   (b) building up of the starch deposit on the tables;
   (c) patrolling the table work and guarding against "channelling", which tends to impair the yield of starch;
   (d) regulating the exit of the gluten from the tables;
   (e) washing and reconditioning the table.
4. Inadequate separation of the gluten from the starch.
5. The ever present hazard of starch decomposing and gluten putrescing while on the tables, especially in hot and humid weather.
6. The heavy investment in buildings, lumber and auxiliary equipment.

Notwithstanding the high state of efficiency which the manufacture of starch from Indian corn has reached in the United States, until now the very important step of separating the starch and the gluten was conducted in very much the same manner as practiced at the time of its inception, nearly a century ago.

Many attempts have been made in the past to supplant the starch tables by resorting to other means for separating the gluten and the starch. Centrifugal apparatus of various designs were employed, for instance, but these devices failed to produce the desired result, partly because the separation was not sufficiently "clean", partly because there was an excessive amount of a slushy stratum from which pure starch could not readily be recovered or, and this was most often the case, centrifugal means failed because the separating capacity of the centrifugal device was too limited to permit of economic operation on an industrial scale.

Subsequently an attempt was made to use compressed air with the table heads, to pass such aerated mixture through centrifugals and then, after discharging into a suitable vessel cause the gluten to rise to the surface, and the starch to settle at the bottom of the vessel. This attempted separation was based upon the expectation that the impregnation of the table heads with a carefully controlled amount of air would cause a sufficient difference in specific gravity between starch and gluten, both suspended in water, as to make an efficient and satisfactory separation possible. However, this method was not adopted in industrial practice on account of its inherent defects, the principal one of which, aside from the insufficient capacity of the centrifuge, was the inability to incorporate, in this manner, a sufficient amount of air in the table heads to produce that difference in specific gravity necessary to float the gluten. That is to say, the air, limited in amount as it was because the impregnation was carried on at atmospheric pressure, was but loosely suspended in the centrifuged mixture of starch and gluten and was rapidly released, with the result, that the artificially created difference in specific gravity between the starch and the gluten tended to quickly become dissipated, if not destroyed entirely, and the bulk of the gluten, together with the starch, would gravitate downwards, contaminating the starch and defeating separation.

The designation "gluten", as used herein, is not meant to be limited to nitrogenous matter in a pure state, but is meant to include starch, oil and fibrous substances which are usually commingled with the pure gluten at this stage of the starch manufacturing process.

It will be readily understood that the customary type of centrifuges contemplated by the prior art, such as was described in U. S. Patent No. 994,497, tended to nullify operative aeration, among other things, because of the use of an unconfined chamber, because of jets of compressed air breaking up the starch milk into a spray and because of the effect of centrifugal force on such a spray in an unconfined chamber. Another defect of the aeration method was that the air, intended for the separation of gluten, was introduced into such unconfined chamber in the form of compressed air, which, as a matter of course, ceased being under pressure the moment it was released into the starch-gluten mixture. Although many attempts have been made to overcome the defects and shortcomings of the prior process, none, as far as I am aware, has been wholly successful and satisfactory, especially when carried into practice on an industrial scale.

I have discovered, contrary to prior principles, beliefs and observations, that it is not necessary to restrict and limit the volume of air to be incorporated with the table heads; on the contrary, I consider a copious amount of air essential to the formation of a satisfactory and stable conglomeration of the gluten, as the operative difference in specific gravity between the starch and the gluten of aerated table heads depends mainly upon the amount of incorporated air and the manner in which the incorporation is effected. The more air is dispersed in the water, the lower is its specific gravity and, by the same token, in the same ratio as the volume of air dispersed in the table heads is increased, so does the difference in specific gravity widen between the starch and the gluten.

I have further discovered that the air must be incorporated with the table heads under sustained pressure, by which I mean that the pressure must be maintained while the aeration takes place. The purpose of sustained pressure is threefold: firstly, to firmly incorporate the air with the table heads and retain it therein; secondly, to reduce the particle size of the air bubbles and thereby effect their minute dispersion in the table heads; thirdly, to effect a thorough homogenization of all the components of the aerated table heads, which step I consider essential to a satisfactory conditioning of the table heads for the ensuing separation of the gluten from the starch. I support and increase these effects of sustained pressure by forcing the treated mass through a controllable low clearance, preferably of the order of 5 to 15 microns, or less.

An object of my invention is to eliminate the cumbersome old method of using tables for the separation of the starch and gluten and to separate the two from each other by an expeditious and simple method.

It is also an object of the invention to provide a process which can be carried out practically on an industrial scale and with a high degree of efficiency.

It is also within the contemplation of the invention to provide a process which can be carried into practice with simple and standard apparatus and to therewith effect the separation of the starch and gluten.

Other objects and advantages of the invention will become apparent from the following description of a preferred procedure of carrying the invention into practice taken in conjunction with the drawing which is a diagrammatic illustration of a preferred embodiment of an apparatus for carrying my invention into practice on an industrial scale.

Broadly speaking, my invention contemplates the incorporation within the liquid mass, hereinbefore referred to as "table heads", of a copious amount of minutely dispersed air while subjecting the liquid mass to and maintaining it under high pressure and the creation of a sufficient difference in the specific gravities of the starch and gluten as to cause the gluten to sharply break away from the starch portion of the mass and to "float" thereon as a quasi solid mass of conglomerated gluten, oil, fibrous matter and air, which does not proceed to dissipate at once, but remains stable throughout the time required for carrying it off into collecting vats. In addition to gluten, oil, fibrous matter and air, the gluten conglomerate retains a certain amount of starch, in the same manner that the gluten, tailing off the starch tables, retains a certain amount of starch.

In carrying out my invention on an industrial scale, I preferably proceed in the following manner: I use a grinding device, or mill, preferably of the type generally known in the art and trade as "colloid" mills, which preferably though not necessarily, has the following features:

(a) a feeding mechanism for the air and the table heads;

(b) a conical rotor and stator;

(c) a controllable low final clearance (orifice, "gap"), formed by the rotor and stator;

(d) a device for the discharge of the mass under pressure into separating vessels.

In the drawing, the aforesaid "colloid mill" is represented in a diagrammatic manner. A hopper H mounted on casing M and frame F is provided for establishing a body of starch milk. The starch milk flows through the hopper or feeding device and is sucked into the mill together with copious amounts of air. When desirable, a baffle B may be provided above inlet T of impeller or rotor I of a feeding centrifugal pump for the purpose of reducing any swirling tendency of the liquid. Below impeller I of the feeding pump, a rotor R of the colloid mill is mounted on a common shaft designated by the reference character D. This shaft likewise carries a discharge centrifugal pump P. An electric motor (not shown) rotates shaft D through a suitable drive.

The liquid starch milk together with copious amounts of air in the form of bubbles is sucked into the feed pump by the action of the impeller I and is ejected from the pump under high pressure into the channel E from which it passes under the positive high pressure exerted by the centrifugal pump I to a gap G formed between the rotor R and stator S. In the gap or clearance between rotor R and stator S the liquid starch milk is under the influence of the high pressure exerted by the rotation of the rotor and the air or gas dispersed in the flowing stream or body of liquid starch milk and further broken up as minute bubbles. The rotor R and the stator S operate with only a minute clearance or gap of the order of 5 to 15 microns which is adjustable to suit the needs of any particular operation. After being subjected to the high pressure created by the rotation of the rotor R, the homogenized liquid milk containing copious amounts of air in the form of minute bubbles still under high pressure passes through a gap of minute clearance into the discharge centrifugal pump P which forms a valve or seal to form a body of liquid starch milk from the feeding pump through the gap G to the discharge pump, etc.

While still under the liquid pressure created by the feed centrifugal pump, the flowing stream of liquid starch milk is constricted and the effect of a substantially confined chamber within the mill is obtained. The aerated starch milk then passes from the colloid mill through outlet O. By closing valve V, the starch milk can be returned to hopper H for further treatment or by opening valve V, the starch milk may be permitted to flow through pipe W to suitable separators or to settling tanks described hereinafter. The rotor may be of the smooth surface type or may be provided with ribs W as also may be the stator as those skilled in the art will readily understand.

I introduce into this mill the hereinbefore mentioned table heads, preferably of a specific gravity corresponding to approximately 6° Baumé (at 60° F.), the temperature of which I previously have preferably raised to about 90° F., and I so regulate the rate of flow that the feeding mechanism will preferably entrap or suck in a copious amount of air. I set the speed of the feeding mechanism at from about 1750 to about 3500 revolutions per minute, depending upon the size and capacity of the mill and thereupon I pass the table heads successively first through the feeding mechanism and then through the clearance formed by the rotor and stator, which is very low and on that account requires the high pressure created in the feeding mechanism and maintained in the apparatus. An advantage may be gained by providing the rotor and stator with grooved surfaces because of the extreme grinding effect achieved thereby upon the fibrous particles usually commingled with the starch and gluten. Frequently these particles, in an unground state, are, microscopically observed, larger than either the starch or the gluten particles and, in that event, may tend to impede an optimum separation of the gluten from the starch particles. It is a further advantage to pass the treated mass through a discharge device of the same general construction as the feeding mechanism, and I intend such device mainly to serve the purpose of "sealing" the apparatus so as to insure a confined chamber, and of effecting, under pressure, a rapid discharge of the treated mass into the separating vessels. These vessels are practically of the same design as the "starch settlers", generally employed in the manufacture of starch from Indian corn, that is to say, round steel tanks open at the top and provided with cone-shaped bottoms. The liquid mass, continuously emitted by the above mentioned discharge device and entering the tank through a pipe line terminating near the bottom, quickly separates into the two main strata, namely, starch and the gluten conglomerate. The latter, retaining practically all of the oil originally present in the table heads, collects rapidly, rises to the surface and is drawn off by an overflow, i. e. an outlet situated near the upper rim of the tanks. The starch settles at the bottom, retains a relatively small amount of water and forms therewith a "heavy" starch liquor. Intervening between the heavy starch liquor and the gluten conglomerate is another stratum, viz. fine particles of starch suspended in a relatively large amount of water, which stratum may be designated as a "light" starch liquor. The separation of the gluten is usually accompanied by a striking phenomenon in that a sharp "break" occurs between the gluten conglomerate and the sub-stratum, meaning that a stratum of clear water appears directly beneath the layer of gluten conglomerate, so that the separation actually produces four separate strata, to wit: "heavy" starch liquor, "light" starch liquor, clear water and gluten conglomerate. The latter usually retains less starch than is found in the gluten tailing off the starch tables and the starch liquor, light or heavy, usually contains less protein than table starch.

The starch, as well as the gluten conglomerate after leaving the separating tanks, are further processed in a manner well known to those skilled in the art. The starch milk, withdrawn at the bottom of the separating tanks, is especially well suited to the manufacture of pure corn starch because of its high degree of purity, that is to say, because of its extremely low content of oil and protein. The stratum above the "heavy" starch milk, composed of fine starch particles suspended in a relatively large body of water in those manufacturing establishments, in which not only corn starch but corn syrup and corn sugar are produced, can readily be employed in making up the converter charges of starch, acid and water, as employed in the manufacture of corn syrup and corn sugar.

Among the principal advantages of my new and improved method over the prior method of separating starch and gluten, as a step in the process of manufacturing starch from Indian corn, are the following:

1. Accelerated separation of starch and gluten.
2. Improved separation of the gluten from the starch.
3. Elimination of troublesome decomposition and putrefaction.
4. Saving in labor and materials.
5. Increased yield of starch.
6. Improved color of the starch.
7. Removal of the oil from the starch to the gluten.
8. Increased content of protein in gluten.
9. Saving in investment.

It will be clear that in practicing my invention on an industrial scale, I may increase the protein of the gluten by re-processing the separated gluten in the manner hereinbefore described and, likewise, I may still further reduce the amount of protein in the starch by re-processing the starch liquor in the manner hereinbefore described and I mean to include such re-processing as within the scope of my invention. It will also be clear that my invention may advantageously be used on an industrial scale in combination with present day starch-table practice, or with other starch-gluten separating devices, centrifuges for instance.

It will further be clear that if, for aerating purposes, I employ a gas lighter than air, hydrogen, for instance, or helium, I can thereby still further increase the difference in specific gravity between the starch and the gluten and I mean to include the use of any gas lighter than air as within the scope of my invention.

Furthermore, it is to be noted that I do not wish to limit myself to the use of any particular apparatus or equipment, including the "colloid" mill hereinbefore described, to carry my method into industrial practice, for I may use any appropriate apparatus which, for the purpose of separating the gluten from the starch, conditions the table heads in the manner likewise hereinbefore described. For instance, I may dispense with the special discharge device, hereinbefore referred to, as any low clearance "colloid" mill will effectively "seal" the apparatus and will thereby provide a confined chamber such as is necessary to subject the table heads to sustained pressure while incorporating a gas or air within said table heads.

The optimal functioning of my invention can be influenced by several factors such as the concentration of the table heads, the proportion therein of starch and gluten, the temperature of the table heads, the amount of oil contained in the table heads, and, within certain limits, by the pH value of the table heads.

The formation of a conglomeration of gluten and air is facilitated by the presence of oil in the table heads, the oil being a natural constituent of Indian corn. The oil seems to serve in the capacity of what is known in the art of mineral separation by flotation as a "collector" and causes the particles of air and gluten to adhere to each other in an intimate union. On this account, I have found it advantageous at times to add to the table heads a small amount of vegetable or mineral oil or of a fatty acid such as oleic. Although the aforesaid assumption appears to explain the phenomenon, nevertheless I do not wish to be limited to this theory.

I claim:

1. The improvement in the manufacture of starch from Indian corn which comprises establishing a flowing stream of liquid starch milk containing particles of starch and particles of gluten under high pressure, incorporating copious amounts of a gas in the form of finely dispersed minute bubbles within said flowing stream of starch milk while maintaining said flowing stream under said high pressure in a substantially confined chamber whereby copious amounts of said finely dispersed bubbles of gas become associated with said gluten particles, and effecting a separation of particles of starch from particles of gluten and associated bubbles of said gas by means of the buoyant effect of said gas bubbles while in said flowing stream of milk.

2. The improvement in the manufacture of starch from Indian corn which comprises establishing a flowing stream of liquid starch milk containing particles of starch and particles of gluten under high pressure, incorporating copious amounts of air in the form of minute bubbles finely dispersed throughout said flowing stream of liquid starch milk while maintaining said flowing stream under said high pressure whereby said finely dispersed bubbles of air become associated with said gluten particles, and effecting a separation of particles of starch from particles of gluten and associated bubbles of air by means of the buoyant effect of said air bubbles while in said flowing stream of milk.

3. The improvement in the manufacture of starch form Indian corn which comprises establishing a pool of starch milk containing particles of starch and particles of gluten under high pressure, continuously removing portions of said pool as a flowing stream under high pressure, incorporating copious amounts of air in the form of minute bubbles finely dispersed throughout flowing stream of liquid starch milk under high pressure whereby said finely dispersed minute particles of air become associated with said gluten particles, forcing said flowing stream and said incorporated minute bubbles of air through a gap having a minute clearance to maintain said high pressure and effecting a separation of particles of starch from particles of gluten and associated bubbles of air by means of the buoyant effect of said air bubbles while in said flowing stream of milk.

4. The improvement in the manufacture of starch from Indian corn which comprises establishing a pool of liquid starch milk containing particles of starch and particles of gluten under high pressure, removing portions of said pool as flowing stream under high pressure, incorporating minute bubbles of air finely dispersed throughout said flowing stream of liquid starch milk under high pressure whereby said minute bubbles of air become associated with said gluten particles, constricting a portion of said flowing stream and said incorporated bubbles of air to an effective, narrow cross section to maintain said high pressure and effecting a separation of said starch particles from said gluten particles and associated bubbles of air by means of the buoyant effect of said air bubbles while in said flowing stream.

5. The improvement in the manufacture of starch from Indian corn which comprises establishing a flowing stream of liquid starch milk having a specific gravity of about 6° Beaumé under high pressure, said flowing stream of starch milk containing particles of starch and particles of gluten, and fibrous material, incorporating minute bubbles of air finely dispersed throughout said flowing stream while under said high pressure, whereby said minute bubbles of air become associated with said gluten particles and fibrous material, forcing said flowing stream and said incorporated bubbles of air through a gap having a clearance of about 5 to about 15 microns during discharge to maintain said flowing stream under said high pressure and effecting a separation of starch particles from gluten particles and associated bubbles of air and fibrous material by means of the buoyant effect of said air bubbles while in said flowing stream of milk.

6. The improvement in the manufacture of starch from Indian corn which comprises establishing under high pressure a flowing stream containing particles of starch and particles of gluten, incorporating copious amounts of minute bubbles of air finely dispersed throughout said flowing stream while under high pressure, whereby said minute bubbles of air become associated with said gluten particles, constricting the cross section of said flowing stream and said incorporated minute bubbles of air to a cross section at least one dimension of which is between about 5 and about 15 microns whereby said high pressure is maintained and effecting a separation of gluten particles and associated bubbles of air from starch particles by flotation while in said flowing stream.

7. The improvement in the manufacture of starch from Indian corn which comprises establishing a flowing stream of liquid starch milk having a specific gravity corresponding to about 6° Beaumé containing particles of starch and gluten and under high pressure, homogenizing said flowing stream and incorporating minute bubbles of air finely dispersed within said flowing stream under high pressure, whereby said minute bubbles become associated with said gluten particles, forcing said homogenized and aerated flowing stream through a gap of minute clearance whereby said high pressure is maintained, and effecting a separation of starch particles from gluten particles and associated air by means of the buoyant effect of said air bubbles while in said flowing stream.

THEODORE B. WAGNER.